United States Patent Office 3,258,436
Patented June 28, 1966

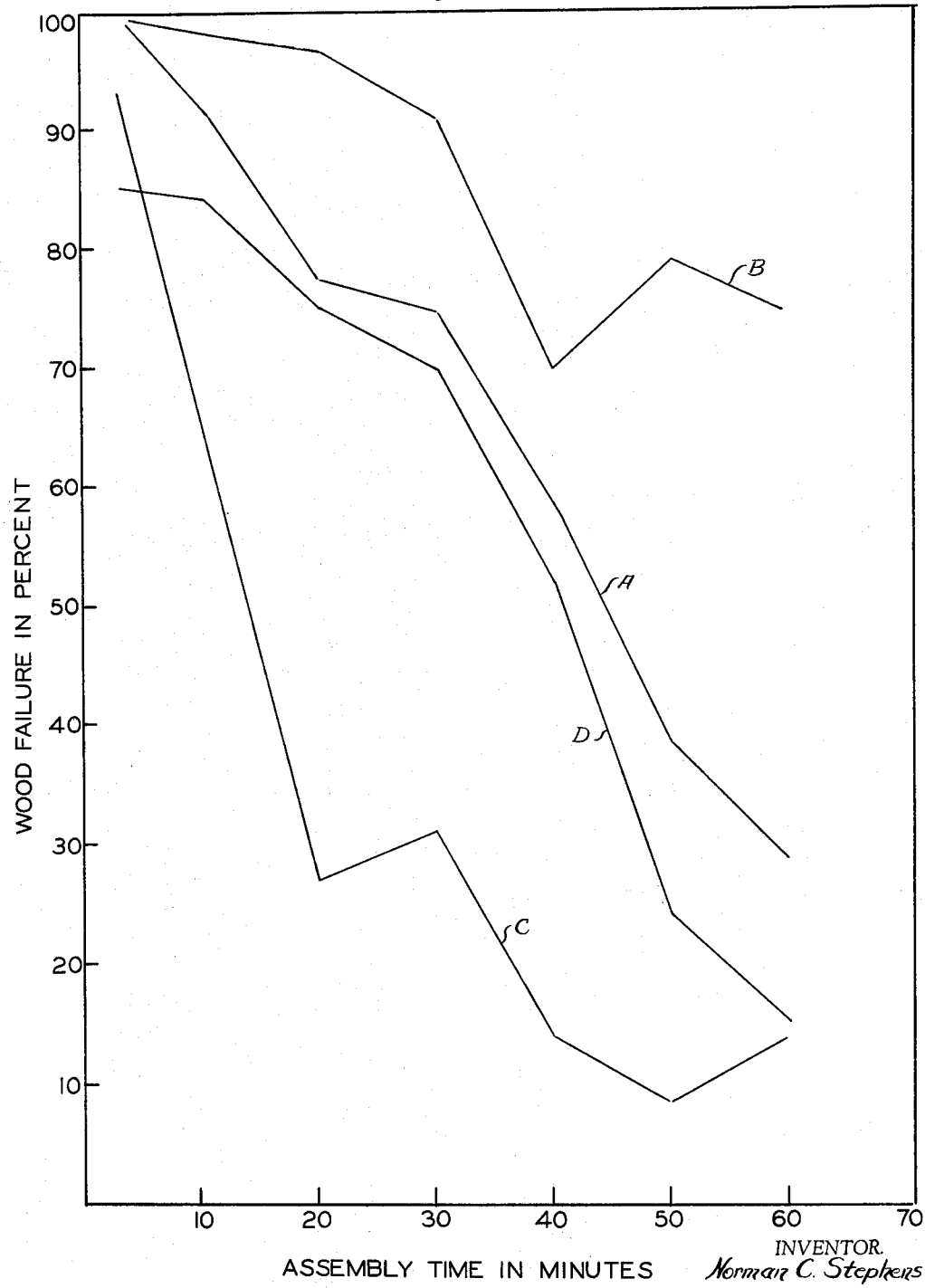

3,258,436
PHENOLIC ADHESIVE AND EXTENDER FOR
USE THEREIN
Norman C. Stephens, Portland, Oreg., assignor to The
Quaker Oats Company, Chicago, Ill., a corporation of
New Jersey
Filed Apr. 30, 1962, Ser. No. 191,084
4 Claims. (Cl. 260—17.2)

This invention relates to a new composition having particular utility as an extender material with synthetic adhesives such as phenolic adhesives and to adhesive compositions containing the same.

The use of synthetic resins in various applications requiring a thermosetting adhesive is, of course, well known. Thus, for example, phenol-aldehyde resins find widespread use in the plywood industry where the phenolic resins are employed as adhesives to bond wood veneer sheets to produce plywood. In manufacturing plywood a suitable phenolic adhesive is spread on the wood veneer panels which are then assembled and bonded together by the application of heat and pressure in a platen type hot press. The bonded plywood may then be stacked using retained heat to further advance the cure of the adhesive resin.

In the plywood fabricating operation, the plywood assembly time characteristics of a given adhesive are of primary significance in determining its successful application. By "plywood assembly time" is meant the time between application of the adhesive to the wood veneer sheets and application of heat and pressure to the superimposed veneer sheets. A relatively long assembly time is desired so that the mill workers have sufficient time to handle and properly assemble the wood veneer sheets prior to loading into hot platen presses for final curing. With the attainment of this desideratum the production of defective plywood is maintained at a low level which is, of course, of utmost commercial significance. A further advantage of long assembly time is that smaller quantities of the glue can be employed since it is not necessary to apply excessive amounts of glue as is commonly done in an effort to extend the allowable assembly time. An assembly time of at least 20 minutes and preferably 30 minutes or more is generally desired.

While providing the desired long assembly time, the adhesive or glue composition must also possess a number of properties under constant control. It must be capable of curing or setting rapidly on veneer sheets to provide for hardening within the required curing time cycle, which in modern plywood plants is carefully controlled. The glue composition also must not be too viscous so that it may be spread readily on the veneers and it must remain at a constant consistency to avoid any appreciable variation in the thickness of the glue film applied as the consumption of the batch of glue proceeds. Moreover, the adhesive must provide a final bond of high strength, durability, water resistance and the like while being relatively inexpensive in cost.

As the result of a great deal of experimental work, certain filler or extender materials have been employed with the phenol-aldehyde resins in order to procure an adhesive composition of the desired characteristics. One such extender or filler material which has been found particularly advantageous for use with phenol-aldehyde resins is a by-product material obtained from the production of furfural and comprises the solid residue remaining after the acid hydrolysis of pentosan-containing materials such as ground oat hulls, ground corn cobs and the like, and the removal of the furfural and other chemical products produced thereby. A preferred residue of this type is available from the Quaker Oats Company under the trademark "Furafil." The "Furafil" product comprising various degradation products is highly complex in nature and can best be characterized by a typical analyses which is as follows:

| | Percent |
|---|---|
| 2% caustic soda extractable | 22 |
| Alcohol soluble | 21 |
| Acetone extractable | 20 |
| Ether extractable | 4 |
| Cellulose | 38 |
| Residue from saccharification | 42 |
| Ash | 3 to 5 |
| Carbon (ultimate analysis) | 52 |

The "Furafil" product can be obtained in various particle sizes ranging from a finely divided dark brown powder to a relatively coarse granular residue. One preferred material, "Furafil" 100 is a finely divided material having a bulk density of about 29 pounds per cubic foot, a specific gravity of 1.4 and a screen analyses:

| | Percent |
|---|---|
| Thru 100 mesh | 99 |
| Thru 200 mesh | 95 |
| Thru 325 mesh | 90 |

The more finely divided materials such as the above are generally preferred for use with the phenol-aldehyde resins to produce an adhesive composition, although more coarse granular residues can also be employed satisfactorily. Thus, for example, "Furafil" 40 is a satisfactory commercial material substantially all of which passes a 40 mesh standard screen.

I have discovered that the desirable properties of this type of filler material commonly used in phenolic adhesive compositions can be greatly improved by compounding therewith a relatively minor proportion of non-activated finely divided amorphous carbon having a particle size not substantially greater than the "Furafil" in which it is incorporated and preferably from about 0.3 to 1.0 micron. The finely divided carbon ingredient can be obtained from various sources and can comprise wood charcoal, peach pit charcoal, animal bone black, coconut charcoal and the like. The carbon is incorporated with the principal extender residue in an amount from about 3 to 15 percent with the amount employed having been found to be relatively critical in achieving the desired results.

Thus, the present invention provides an extender composition particularly useful with phenolic resin glues which comprises a major amount of the solid furfural by-product residue remaining from the acid hydrolysis of a pentosan-containing material such as ground oat hulls and ground corn cobs and from about 3 to about 15 percent by weight of finely divided amorphous carbon. The carbon which is added in an amount from about 3 to 15 percent by weight is carbon obtained from an external source and is in addition to the normal carbon content of the residue. The addition of the carbon ingredient to the by-product residue filler material yields a conspicious and very valuable improvement when the resulting extender composition is employed with phenol-aldehyde resins. The presence of the added carbon does not interfere with the subsequent curing of the resin as an adhesive or for other uses, but does impart a desired improvement in the assembly time for plywood manufacture. By the composition of the present invention, it is possible, in particular, to prepare a plywood adhesive which cures rapidly and which has a good assembly time of at least 20 minutes. Moreover, by the use of the new extender compositions, it is possible to employ as adhesives fast-curing phenol-aldehyde resins which could not be employed heretofore as adhesives where a relatively long assembly time is required after application of the adhesive.

The extender compositions of the invention are prepared by mixing the finely divided amorphous carbon ingredient with the by-product furfural residue in the proportions required in any convenient manner to achieve a homogenous blend. The resulting extender compositions can then be suitably employed with phenolic type resins as are well known in the art. Thus, for example, phenol-aldehyde resins with which the extender compositions can be used to advantage are described in United States Patents 2,360,376, 2,437,981, 2,457,493, 2,489,336, 2,495,175 and 2,862,897 as well as others. Likewise, the "Furafil" extender material is described in detail in United States Patent No. 2,727,869; the disclosures in these prior art patents being hereby incorporated herein and made part of this application.

The extender compositions of the invention are employed in glue formulations in any desired amount which is generally between about 5 percent and 50 percent by weight of the resin solids. A typical adhesive composition prepared in accordance with the invention is as follows, the parts being by weight:

| | |
|---|---|
| Water | 21.7 |
| Extender | 11.0 |
| 50% NaOH | 4.6 |
| Sodium carbonate | 2.2 |
| 40% solids resin | 60.5 |

Glue compositions corresponding to the above formulation and containing the extender compositions of the invention were compared under identical conditions with control compositions with respect to improvement in "plywood assembly time." In making these comparisons, fir panels were made up with the adhesives with wet spreads of about 75 pounds per thousand feet of double glue line. The 7/16 inch panel constructions (1/8 inch face and back veneers, 3/16 inch core veneer) were pressed at 300° F. and 175 pounds per square inch for 7 minutes. The assembly time employed in constructing the test panels was varied and plotted against the percentage of wood failure. Wood failure at the ruptured bond was visually estimated after applying a shearing stress sufficient to break the test panels along or near the glue line. The percentage of wood failure is a significant evaluation test with a high wood failure percentage indicating a good adhesive bond.

Utilizing the above test procedure, a number of adhesive compositions having the above formulation were compared. In the control adhesive formulation A, the extender material was "Furafil" 100 alone. In adhesive formulation B, the extender was 95 percent "Furafil" 100 and 5 percent added carbon. In adhesive formulation C, the extender was 80 percent "Furafil" 100 and 20 percent added carbon. In adhesive formulation D, the extender was 98 percent "Furafil" 100 and 2 percent added carbon. The test results for each formulation are shown in the graph of FIG. 1.

As seen from FIG. 1, adhesive formulation B, an adhesive composition containing an extender material of the present invention, is significantly superior to the control adhesive formulation A. The criticality of employing the added carbon ingredient in the extender composition of the invention within the prescribed range is also apparent from the plotted data. As seen, extender compositions containing less than the prescribed minimum amount of carbon (formulation D—2% carbon) and more than the maximum prescribed amount of carbon (formulation C—20% carbon) gave inferior results when compared with adhesive compositions containing the extender composition of the invention.

It is to be understood that additional additives can be employed in the adhesive compositions of the invention. Thus, such conventional additives as hardening agents, antifoam agents, dyes, other filler materials such as blood, amylaceous materials and the like can be employed for specific purposes. Moreover, in place of the phenol-aldehyde resins other phenolic type resins such as cresol formaldehyde resins and resorcinol formaldehyde resins can be employed. The adhesive compositions of the present invention are particularly advantageous for use as plywood adhesives for either interior or exterior plywood, but can also be employed satisfactorily for other applications such as for impregnating paper, cloth and the like, furniture and door manufacture, and as molding material or as a binder for molded products.

Those modifications and equivalents which fall within the spirit of the invention and the scope of the appended claims are to be considered part of the invention.

I claim:
1. A thermosetting adhesive composition comprising an aqueous dispersion of a water-soluble phenolaldehyde resin and an extender therefor consisting essentially of a solid furfural by-product residue from the acid hydrolysis of a pentosan-containing material having added thereto from an external source about 5% by weight of the extender of finely divided non-activated amorphous carbon having a particle size not substantially greater than said residue.

2. A thermosetting adhesive composition as in claim 1 wherein the extender material is employed in an amount from about 5 to 50% by weight of the phenol-aldehyde resin solids.

3. A thermosetting adhesive composition as in claim 1 wherein substantially all of the furfural by-product residue passes a 40 mesh standard screen.

4. A thermosetting adhesive composition as in claim 1 wherein substantially all of the furfural by-product residue passes a 100 mesh standard screen.

References Cited by the Examiner
UNITED STATES PATENTS

| | | | |
|---|---|---|---|
| 1,969,146 | 8/1934 | Omansky | 260—17.2 |
| 2,507,465 | 5/1950 | Ayers | 260—17.2 |
| 2,688,576 | 9/1954 | Ryan et al. | 161—160 |
| 2,724,675 | 11/1955 | Williams | 161—60 |
| 2,727,869 | 12/1955 | Ash et al. | 260—17.2 |
| 2,803,608 | 8/1957 | Richie | 260—17.2 |
| 2,889,241 | 6/1959 | Gregory et al. | 260—17.2 |

JOSEPH L. SCHOFER, *Primary Examiner.*

JAMES A. SEIDLECK, *Examiner.*